United States Patent
Ma

(10) Patent No.: US 9,235,497 B2
(45) Date of Patent: Jan. 12, 2016

(54) METHOD AND SYSTEM FOR DETECTING CONCURRENCY PROGRAMMING ERRORS IN KERNEL MODULES AND DEVICE DRIVERS

(71) Applicant: Zhiqiang Ma, Platteville, WI (US)

(72) Inventor: Zhiqiang Ma, Platteville, WI (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/995,380

(22) PCT Filed: Mar. 27, 2013

(86) PCT No.: PCT/US2013/034131
§ 371 (c)(1),
(2) Date: Jun. 18, 2013

(87) PCT Pub. No.: WO2014/158151
PCT Pub. Date: Oct. 2, 2014

(65) Prior Publication Data
US 2014/0331211 A1 Nov. 6, 2014

(51) Int. Cl.
*G06F 9/44* (2006.01)
*G06F 11/36* (2006.01)

(52) U.S. Cl.
CPC ............ *G06F 11/3688* (2013.01); *G06F 11/36* (2013.01)

(58) Field of Classification Search
USPC ....................................... 714/37–38; 717/131
See application file for complete search history.

(56) References Cited

U.S. PATENT DOCUMENTS

| | | | | |
|---|---|---|---|---|
| 8,190,946 B2* | 5/2012 | Kojima | ............... | G06F 11/0715 714/10 |
| 8,402,318 B2* | 3/2013 | Nieh et al. | ................... | 714/38.1 |
| 8,689,215 B2* | 4/2014 | Hankins | ................ | G06F 9/3851 712/244 |
| 2004/0064759 A1 | 4/2004 | McGuire et al. | | |
| 2005/0210077 A1 | 9/2005 | Balakrishnan et al. | | |
| 2006/0271932 A1* | 11/2006 | Chinya et al. | ................. | 718/100 |
| 2006/0282839 A1* | 12/2006 | Hankins et al. | ............... | 719/318 |
| 2008/0052696 A1* | 2/2008 | Pradadarao | ................... | 717/158 |
| 2008/0148259 A1* | 6/2008 | Hankins | ................ | G06F 9/3851 718/100 |
| 2009/0007075 A1* | 1/2009 | Edmark et al. | ................ | 717/128 |
| 2009/0300424 A1* | 12/2009 | Kojima | ............... | G06F 11/0778 714/39 |
| 2010/0169973 A1 | 7/2010 | Kim et al. | | |
| 2010/0251031 A1* | 9/2010 | Nieh et al. | ...................... | 714/45 |
| 2012/0233509 A1 | 9/2012 | Kojima | | |
| 2013/0159977 A1* | 6/2013 | Crosetto et al. | ............... | 717/128 |
| 2014/0331211 A1* | 11/2014 | Ma | ................................ | 717/131 |

FOREIGN PATENT DOCUMENTS

WO WO-2014158151 A1 10/2014

OTHER PUBLICATIONS

"International Application Serial No. PCT/US2013/034131, International Search Report mailed Dec. 27, 2013", 3 pgs.
"International Application Serial No. PCT/US2013/034131, Written Opinion mailed Dec. 27, 2013", 4 pgs.

* cited by examiner

*Primary Examiner* — Marina Lee
(74) *Attorney, Agent, or Firm* — Schwegman Lundberg & Woessner, P.A.

(57) ABSTRACT

The existence of errors and bugs in device drivers and other software operating in kernel space may be difficult to find and eliminate. A system and method for debugging computer programs may involve the use of several different modules. Running in the kernel space is an event monitor. Running in the user space is an event collector, an event player, and a concurrency error detector. This setup allows one to debug device driver software and other software that executes in kernel space using existing user space error detectors.

22 Claims, 5 Drawing Sheets

METHOD AND SYSTEM FOR DETECTING CONCURRENCY PROGRAMMING ERRORS IN KERNEL MODULES AND DEVICE DRIVERS

This application is a U.S. National Stage Filing under 35 U.S.C. 371 from International Application No. PCT/US2013/034131, filed on Mar. 27, 2013, which is incorporated herein by reference in its entirety.

TECHNICAL FIELD

Embodiments pertain to software. Some embodiments pertain to methods for detecting errors in software.

BACKGROUND ART

An operating system is a collection of software that manages the resources of a computing device and provides services for computer programs to operate within. There are many operating systems in use today. Common operating systems in use today include Microsoft Windows™, OS X®, iOS®, the open-source Linux® OS, and Android®. It should be understood that computing devices may include desktop computers, servers, laptop computers, portable devices such as phones and tablets, gaming consoles, digital video recorders, other devices containing computing elements, and the like.

Device drivers are computer programs that operate within an operating system and are used to operate or control a device attached to a computer. Device drivers communicate with devices that are attached to the computer. Device drivers allow a computer program to communicate with external devices even if the program has no specific knowledge of what type of the external device. For example, when a computer program issues a print command to a printer, a device driver handles the converting of information to a format that the printer may understand. A user may attach different printers from different manufacturers to the computer, but a program may still print to the different printers because the device drivers handle the communication to each printer. Many different devices use device drivers, including printers, video adapters, network adapters, sound cards, storage devices, cameras, and the like.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DESCRIPTION OF THE EMBODIMENTS

Figure 1:
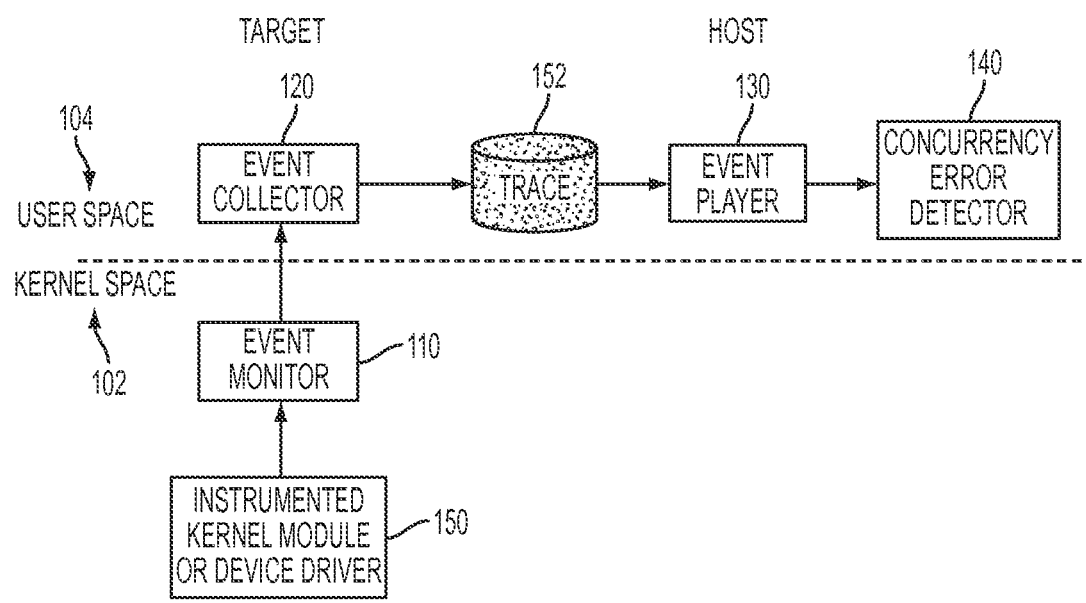
FIG. 1 is a block diagram illustrating an embodiment.

The following description and the drawings sufficiently illustrate specific embodiments to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for, those of other embodiments. Embodiments set forth in the claims encompass all available equivalents of those claims.

In the following detailed description, numerous specific details are set forth in order to provide a thorough understanding of the invention. However, it will be understood by those skilled in the art that the present invention may be practiced without these specific details. In other instances, well-known method, procedures, components, and circuits have not been described in detail so as not to obscure the present invention.

Although embodiments of the invention are not limited in this regard, the terms "plurality" and "a plurality" as used herein may include, for example, "multiple" or "two or more." The terms "plurality" or "a plurality" may be used throughout the specification to describe two or more components, devices, elements, units, parameters, and the like. For example, "a plurality of stations" may include two or more stations.

A typical computer operating system segregates the available memory into a kernel space and a user space. Kernel space is typically used to run the operating system and the device drivers. User space is where most other applications (e.g., music players, movie players, games, browsers, business software, and the like) operate. While there are performance advantages to running a device driver in the kernel space as opposed to user space, there are disadvantages to running a device driver in kernel space. An error or bug in the user space may be contained. Most bugs that crash a piece of software operating in the user space only crashes that particular program—other programs operating in user space are unaffected. In contrast, errors or bugs within a device driver that is running in kernel space may cause problems in the kernel space, such as overwriting important areas of the kernel space memory. Such problems may cause the entire operating system to crash, which may lead to every program crashing. The result of this is that approximately 80% of system crashes in the Microsoft Windows OS® are caused by bugs in device drivers. Similarly, the bug rate of device drivers in Linux is approximately seven times higher than the bug rate of the rest of the kernel.

Operating systems and computers of the present (and presumably the future) are often capable of executing multiple instructions at the same time. This is usually done using techniques such as multiple processors and/or multiple threads. These techniques increase the performance of computers but they may result in errors that may be difficult to detect.

One example of such an error that may be difficult to detect is a race condition. A race condition arises when separate processes or threads depend on a shared state. This may occur when two separate threads try to access the shared data and at least one of the data accesses is a write.

As a simple example, assume two threads each have a simple task—to increment a variable y by 1. Assume that y=1 before the threads occur. In the first example, thread one executes before thread two. Thread one reads the variable y as 1, increments y to 2, then writes the variable y=2 to memory. Thread two then executes. It reads the variable y from memory, finds out that the value is 2, increments the value to 3, then writes the variable y=3 to memory.

In the second example, thread one and thread two operate concurrently. Both thread one and thread two read the value of y as 1. Both threads then increment the value y, then write the value to memory. But both thread one and thread two write the value of y=2 to memory. Therefore, if the threads execute one after the other, the result may be different (v=3 in the first example) than when the threads operate concurrently (v=2 in the second example). While all such errors are difficult to detect, they are even harder to reproduce and debug in device drivers because device drivers may execute in kernel space, which is harder to debug.

With reference to FIG. 1, a block diagram of how an embodiment may be implemented is presented. An embodiment may operate within both kernel space 102 and user space 104. An embodiment may contain several components: an event monitor 110 (in kernel space 102), an event collector 120 (in user space 104), an event player 130 (in user space 104) and a concurrency error detector 140 (in user space 104). In an embodiment, event monitor 110 and event collector 120 may run on a computing device while event player 130 and concurrency error detector 140 may run on a development host. Also illustrated in FIG. 1 are instrumented kernel module or device driver 150 and trace 152. Instrumented device driver 150 is the device being tested by an embodiment. Trace 152 serves to collect information from event collector 120 and forward to event player 130.

Event Monitor

Event monitor 110 is a device driver running inside the kernel space on the target device. To illustrate how the event monitor works and what events are being monitored, the concept of driver context should be discussed first. The concept of driver context is better explained using an example with code.

Listing 1 is an example listing of program "testfoo.c" for this discussion.

Listing 1

```
/* testfoo.c
    this is the main program that opens
    a device driver/dev/foo
    then creates two threads,
    a write_foo thread and a read_foo thread,
    and waits for their completions before
    closing the file */
int fd;
char data[256];
void *read_foo (void *arg)
{
    read(fd, data, 256);
}
void *write_foo (void *arg)
{
    write(fd, data, 256);
}
int main ( )
{
    pthread_t thr, thw;
    fd = open ("/dev/foo", O_RDWR);
    pthread_create (&thw, 0, write_foo, 0);
    pthread_create (&thr, 0, read_foo, 0);
    pthread_join (thr);
    pthread_join (thw);
    close (fd) ;
    return 0;
}
```

With reference to Listing 1, sample C code of a program called testfoo.c is presented. In Listing 1, the application testfoo.c opens a device /dev/foo first, and then creates two child threads, write_foo( ) and read_foo( ). One child thread (write_foo( )) is used to write data to the device and the other child thread (read_foo( )) is used to read data from the device. Once testfoo.c has completed the reading and writing tasks, it closes the device. The use of threads in Listing 1 shows that read_foo( )( ) and write_foo( ) are able to operate in parallel. The kernel driver for a device dev/foo may have open( ), read( ), write( ), and release( ) operations.

Sample code examples for the kernel driver are shown in Listing 2. The accesses to shared variable x in foo_write( ) and foo_read( ) in the driver code may create a race condition, which is explained in further detail below.

Listing 2

```
/* the following code examples are from the kernel
    driver
        for device/dev/foo
        this code can he called by the program testfoo.c
*/
/* this function is called when an
open ( ) system call is made*/?
int foo_open (struct inode *inode, struct file *file)
{
    ...
}
/* this function is called when a
read ( ) system call is made */
ssize_t foo_read (struct file *file, char _user *buf,
size_t count, loff_t *fpos)
{
    x++;
    ...
}
/* this function is called when a
write ( ) system call is called */
ssize_t foo_write (struct file *file, const char _user
*buf, size_t count, loff_t *fpos)
{
    x++;
    ...
}
/* this function is called when a
close ( ) system call is called */
int foo_release (struct inode *inode, struct file
*file)
{
    ...
}
/* this interrupt handler is invoked when an
an interrupt occurs */
void foo_interrupt (int irq, void *devid, struct
pt_regs *regs)
{
    ...
}
```

Each file operation or handler may be considered a context. A context begins when an operation or handler starts and it ends when the operation or handler completes. For example, the driver for /dev/foo enters open context when foo_open( ) is called and it leaves open context when foo_open( ) returns. (See Listing 2). Similarly, the driver enters the interrupt context when foo_interrupt( ) is called and it leaves the interrupt context when foo_interrupt( ) returns. (See Listing 2).

Each context has a type. In this example, the contexts may include, for example, CONTEXT_OPEN, CONTEXT_RELEASE, CONTEXT_READ, CONTEXT_WRITE. CONTEXT_INTERRUPT etc. Each context also has an identifier ("id"), which is the file pointer (e.g., the value of argument struct file *file) for file operations or the interrupt number (e.g., interrupt request (irq)) for interrupt handlers.

Event monitor 110 monitors various events that occur on the target device under analysis. These monitored events include, but are not limited to, the following: context entry/exit; memory read/write; memory allocation/de-allocation (per-Central Processing Unit (CPU) memory and global memory); synchronization (thread creation/join, mutex_creation, mutex lock/unlock, interrupt handler registration/deregistration etc.); and function call/return.

To monitor these events, the driver code may be instrumented (see block 150 of FIG. 1). In other words, for each event of interest, extra code may be inserted and executed at run-time to record the event of interest in internal buffers. Instrumentation may be performed in a variety of different ways. In general, instrumentation may be done at a source level, for example, using a compiler, or at a binary level, for example, using kernel probes, or a combination of both.

For each event of interest, the following information may be recorded by event monitor 110: the event type, the thread identifier ("id"), the CPU id and the instruction pointer. For context entry and exit event, the type of context (CONTEXT_OPEN, CONTEXT_RELEASE, CONTEXT_READ, CONTXT_WRITE, CONTEXT_INTERRUPT etc.) and the context id may be recorded. For memory read and write events, the address of the memory accessed and the size of the memory accessed may be recorded. For memory allocation/de-allocation, the address of memory, the size of memory and the type of memory (per-CPU memory or global memory) may be recorded. For synchronization events, the address of the synchronization object (for example, thread, mutex, semaphore etc.) and the type of the synchronization may be recorded. For function call/return events, the address of the function entry point and thread stack pointer may be recorded.

Event Collector

With continued reference to FIG. 1, event collector 120 reads the event data that moves from the buffers in event monitor 110. The event data may be stored in a disk file for the event player to read later. In the alternative, the event data may be streamed to event player 130 directly. In essence, event collector 120 moves the event data from kernel space 102 to user space 104. Event collector 120 is arranged to send data to event trace 152.

Event Player

Event player 130 replays each event from event trace 152. However, event player 130 does not replay the execution of the driver code. Instead, event player 130 replays the occurrence of each event and sends each event to concurrency error detector 140 in an order that conforms to a partial-order graph, explained in more detail below.

Event player 130 may be multithreaded. Every driver thread being executed has at least one corresponding thread (called a surrogate thread) in event player 130. Each surrogate thread also has an event queue in event player 130.

Figure 2:
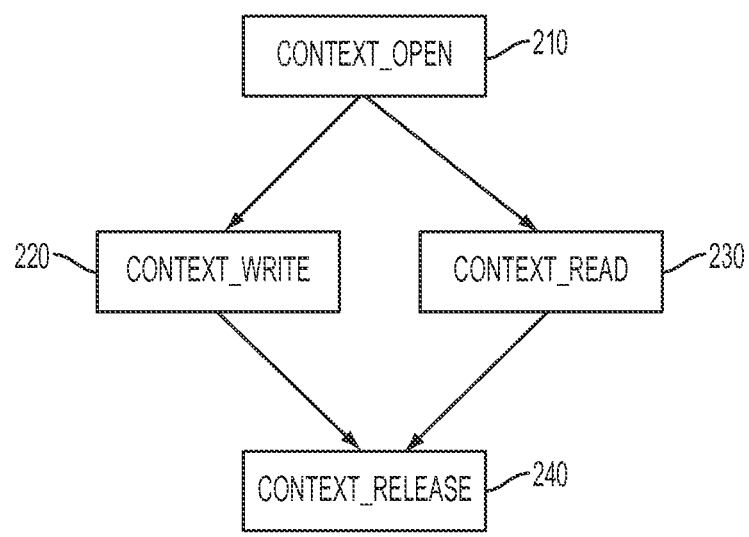
FIG. 2 is a partial order graph illustrating the operation of sample code.

To illustrate the operation of event player 130, one may examine the event trace of the example driver for i/dev/foo, presented earlier in Listings 1 and 2. When that example driver operates, the following contexts are entered and exited:

CONTEXT_OPEN entry
...
CONTEXT_OPEN exit
CONTEXT_WRITE entry
...
CONTEXT_READ entry
...
CONTEXT_WRITE exit
...
CONTEXT_READ exit
CONTEXT_RELEASE entry
...
CONTEXT_RELEASE exit A partial order graph of these contexts is shown in FIG. 2. The CONTEXT_OPEN event 210 leads to the CONTEXT_WRITE event 220 and CONTEXT_READ event 230. CONTEXT_WRITE event 220 and CONTEXT_READ event 230 lead to CONTEXT_RELEASE event 240.

Note that the CONTEXT_WRITE event 220 and CONTEXT_READ event 230 are illustrated in parallel FIG. 2. This is not merely because threads are created and remain active for both the read( ) call and write( ) call in the test program testfoo.c simultaneously. In addition, semantically, the foo_read( ) and foo_write( ) functions may operate in parallel. For example, one could easily construct two single-threaded programs where one program opens, reads, and closes one file of a device and the other program opens, writes and closes a second file of the same device with the same device driver. These two programs could potentially run in parallel.

Similarly, CONTEXT_OPEN event 210 happens before CONTEXT_RELEASE event 240 because a file that may be closed must have been previously opened. However, if CONTEXT_OPEN 210 and CONTEXT_RELEASE 240 each have a different context id (in other words, they are operating on different files), they may operate in parallel without any conflict. In other words, the foo_open( ) function on a first file may operate in parallel with the foo_close( ) function on a second file. This is why a context id is needed for each context.

Each type of driver defines a list of file operations that a driver of that type may have. The semantics of the file operations are typically well-defined—it is usually relatively easy to determine if two file operations (with the same file pointer or different file pointers) may ever run in parallel. So given an event trace, the event player may construct a partial-order context graph while the events are replayed. If two contexts run in parallel, the event player creates two surrogate threads that run in parallel and each surrogate thread replays one context. If two contexts do not run in parallel, the contexts are executed in sequence.

Figure 3:
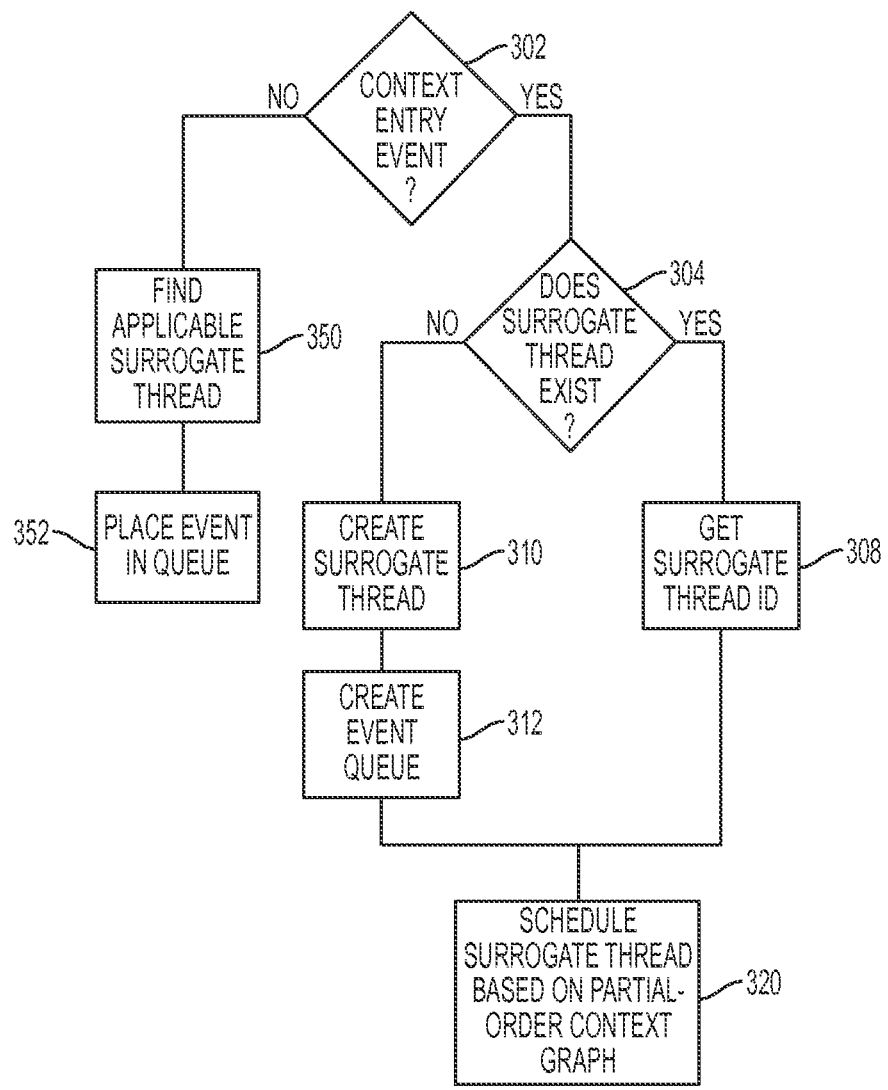
FIG. 3 is a flow chart illustrating the operation of the main thread of an event player in an embodiment.

FIG. 3 is a flow chart illustrating the operation of the main thread of the event player in an embodiment. An event is checked to see if the event is the entry of a context (e.g., CONTEXT_WRITE entry) (302). If the event is not a context entry, then the surrogate thread is already running. The applicable surrogate thread is found (350) and the event is placed in the event queue of the surrogate thread (352).

If the event is a context entry, then it is determined if a surrogate thread is already exists for this context (304). If the surrogate thread exists, the correct surrogate thread and associated id are found (308) and the event is queued in the surrogate thread (320). Otherwise, a surrogate thread is created and relevant information is saved (e.g., driver thread id and surrogate thread id) (310) and an event queue is created for the surrogate thread (312). Thereafter, the surrogate thread is scheduled to run, based on the partial-order context graph (320).

Figure 4:
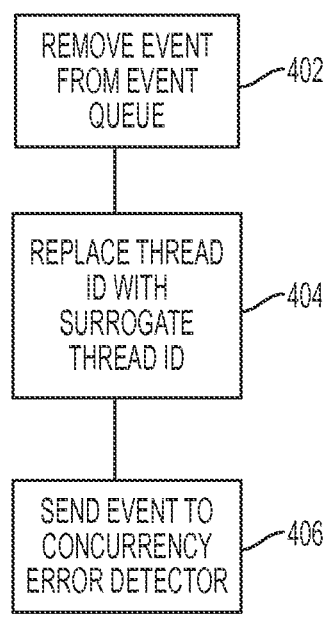
FIG. 4 is a flow chart illustrating the operation of a surrogate thread within an event player in an embodiment.

FIG. 4 is a flow chart illustrating the operation of a surrogate thread within an event player in an embodiment. The event is removed from the queue (402). Thereafter, the thread id is replaced with a surrogate thread id (404).

Thereafter, the event is sent to the concurrency error detector (406), the operation of which is described in further detail below.

Concurrency Error Detector

Concurrency error detector 140 analyzes each event from each surrogate thread in the event player. From the perspective of concurrency error detector 140, the event is taken from a program running in the user space 102, thus simplifying the operation of concurrency error detector 140. Currently existing tools or tools that are created in the future, such as an online or offline thread checker, may be used as a concurrency error detector.

Embodiments convert a problem that exists in the kernel space to a problem that exists in the user space. Instead of detecting data races, for example, in the kernel space by using a kernel debugger, an embodiment detects data races in the user space. Using a kernel debugger to debug a data race requires the data race to actually occur. An embodiment detects data races in the user space even if the data race in the kernel space did not actually occur.

Figure 5:
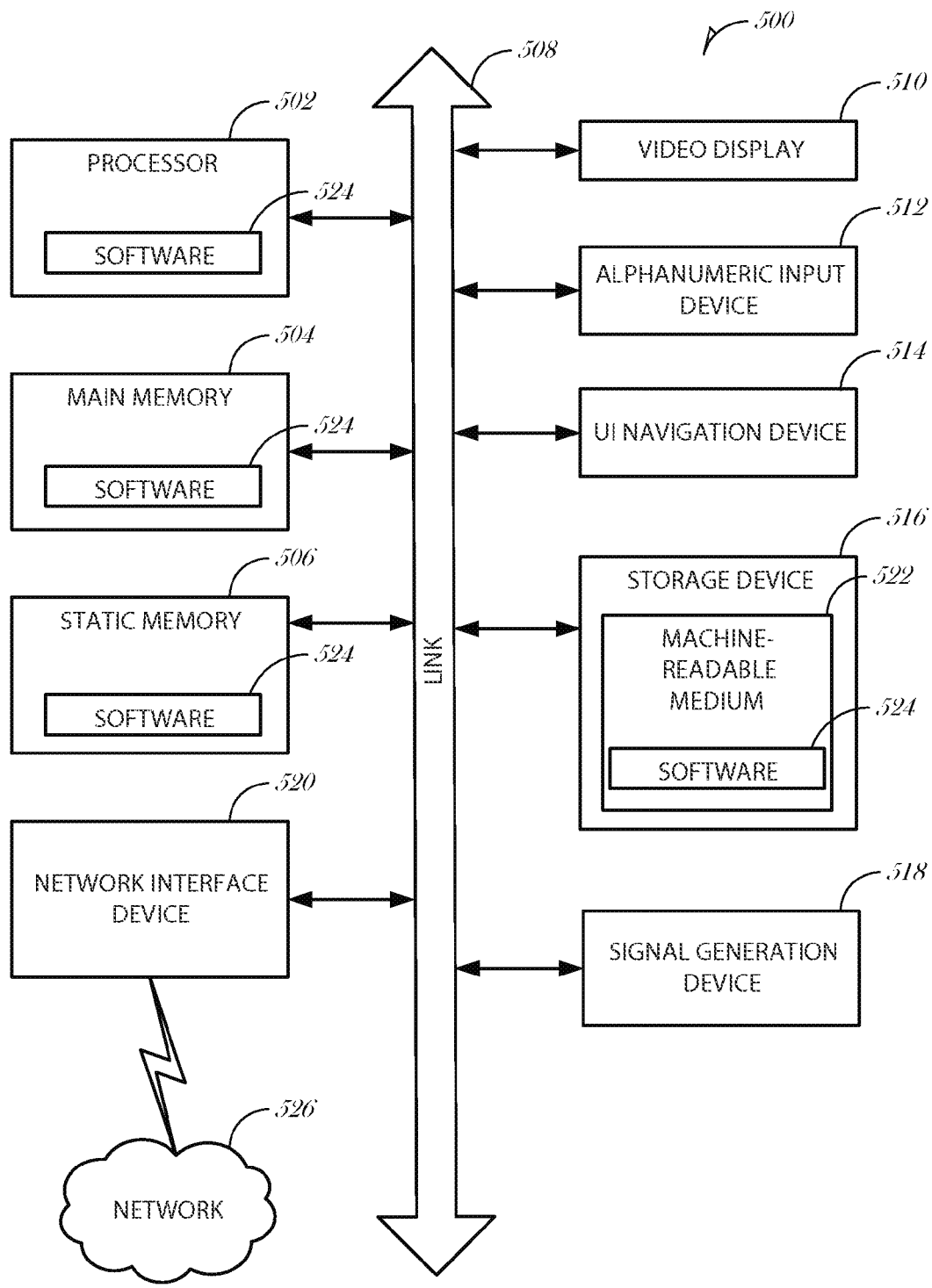
FIG. 5 is a block diagram illustrating an example machine upon which any one or more of the techniques (e.g., methodologies) discussed herein may be performed.

FIG. 5 is a block diagram illustrating an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The machine (e.g., computer system) 500 may include a hardware processor 502 (e.g., a central processing unit (CPU), a graphics processing unit (GPU), a hardware processor core, or any combination thereof), a main memory 504, and a static memory 506, some or all of which may communicate with each other via an interlink 508. Interlink 508 may be any type of communication path, such as a point to point interconnect or a multi-drop bus or a combination thereof. The machine 500 may further include a display device 510, an alphanumeric input device 512 (e.g., a keyboard), and a user interface (UI) navigation device 514 (e.g., a mouse or track pad). In an example, the display device 510, input device 512 and UI navigation device 514 may be a touch screen display that accomplishes all three tasks. The machine 500 may additionally include a mass storage device (e.g., drive unit) 516, a signal generation device 518 (e.g., a speaker), and a network interface device 520. The machine 500 may include an output controller (not shown), such as a serial (e.g., universal serial bus (USB), parallel, or other wired or wireless (e.g., infrared (IR)) connection to communicate or control one or more peripheral devices (e.g., a printer, card reader, etc.).

The mass storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the mass storage device 516 may constitute machine-readable media.

While the machine-readable medium 522 is illustrated as a single medium, the term "machine-readable medium" may include a single medium or multiple media (e.g., a centralized or distributed database, and/or associated caches and servers) that is arranged to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having resting mass. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM, DVD-ROM, and Blu-Ray disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

The following examples pertain to further embodiments.

Example 1 includes subject matter (such as a device, apparatus, or user equipment (UE)) for debugging computer software comprising an event monitor; an event collector coupled to the event monitor; an event player coupled to the event collector; and a concurrency error detector coupled to the event player, wherein the computer software being debugged comprises a plurality of events; the event monitor is arranged to execute the computer software being debugged in a kernel space portion of system memory; the event collector, the event player, and the concurrency error detector are each arranged to execute in a user space portion of system memory; and the event player is arranged to replay each of the plurality of events in the user space portion of system memory.

In Example 2, the subject matter of Example 1 may optionally include wherein the system is arranged to debug device driver software.

In Example 3 the subject matter of any one or both of Examples 1 and 2 may optionally include wherein the computer software being debugged is instrumented.

In Example 4 the subject matter of any one or more of Examples 1 to 3 may optionally include wherein the event monitor is arranged to record event type, thread identifier, CPU identifier, and instruction pointer information.

In Example 5 the subject matter of any one or more of Examples 1 to 4 may optionally include wherein the event monitor is further arranged to record context entry events, context exit events, type of context, and context identifier information related to the context entry events and context exit events.

In Example 6 the subject matter of any one or more of Examples 1 to 5 may optionally include wherein the event monitor is further arranged to record memory address information and memory size information for memory read and memory write events; and the event monitor is further arranged to record memory address information, memory size information, and type of memory information for memory allocation and memory de-allocation events.

In Example 7 the subject matter of any one or more of Examples 1 to 6 may optionally include wherein the event monitor is further arranged to record the address of a synchronization object and the type of synchronization for synchronization events.

In Example 8 the subject matter of any one or more of Examples 1 to 7 may optionally include wherein the event collector is arranged to read event data from the event monitor.

In Example 9 the subject matter of any one or more of Examples 1 to 8 may optionally include wherein the event collector is further arranged to be readable from the user space of system memory.

In Example 10 the subject matter of any one or more of Examples 1 to 9 may optionally include wherein the event player is arranged to read events from the event collector.

In Example 11 the subject matter of any one or more of Examples 1 to 10 may optionally include wherein the event player is further arranged to: create a partial-order graph of events in the event collector; determine if an event is a context entry event; if the event is a context entry event, create a surrogate thread and an event queue for the surrogate thread; and schedule the execution of the surrogate thread based on the partial-order graph.

In Example 12 the subject matter of any one or more of Examples 1 to 11 may optionally include wherein creating a partial order graph comprises determining if events from the event collector are capable of being executed in parallel.

In Example 13 the subject matter of any one or more of Examples 1 to 12 may optionally include wherein the concurrency error detector is arranged to analyze each event from a surrogate thread in the event player.

Example 14 may include, or may optionally be combined with the subject matter of any one of Examples 1-13 to include subject matter (such as a method, means for performing acts, machine readable medium including instructions that, when performed by a machine cause the machine to performs acts, or an apparatus configured to perform) for debugging computer program code comprising instrumenting the computer program code, wherein the computer program code comprises a plurality of events; executing the program code in a kernel space of system memory; monitoring each event during the execution of the computer program code; recording data regarding each event; reading data regarding each event in the a user space of system memory; replaying each event in the user space of system memory; and analyzing each event in the user space of system memory.

In Example 15, the subject matter of Example 14 may optionally include wherein monitoring each event comprises recording event type, thread identifier, CPU identifier, and instruction pointer information.

In Example 16 the subject matter of any one or both of Examples 14 and 15 may optionally include wherein monitoring each event further comprises: recording context entry events, context exit events, type of context, and context identifier information related to the context entry events and context exit events; recording memory address information and memory size information for memory read and memory write events; recording memory address information, memory size information, and type of memory information for memory allocation and memory de-allocation events; recording the address of a synchronization object and the type of synchronization for synchronization events.

In Example 17 the subject matter of any one or more of Examples 14 to 16 may optionally include wherein replaying each event in the user space of memory comprises: creating a partial-order graph of the plurality of events; determining if an event in the plurality of events is a context entry event; if the event is a context entry event, creating a surrogate thread and an event queue for the surrogate thread; and scheduling the execution of the surrogate thread based on the partial-order graph.

In Example 18 the subject matter of any one or more of Examples 14 to 17 may optionally include wherein creating a partial order graph comprises determining which events of the plurality of events are capable of being executed in parallel.

In Example 19 the subject matter of any one or more of Examples 14 to 18 may optionally include creating a surrogate thread for each event that is capable of being executed in parallel.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

While certain features of the invention have been illustrated and described herein, many modifications, substitutions, changes, and equivalents may occur to those skilled in the art. It is, therefore, to be understood that the appended claims are intended to cover all such modifications and changes as fall within the scope of the invention. Although there has been discussion of using embodiments to debug device driver software, it should be understood that embodiments may be used to debug any type of software program.

What is claimed is:

1. A system for debugging computer software comprising:
   a processor;
   an event monitor;
   an event collector coupled to the event monitor;
   an event player coupled to the event collector; and
   a concurrency error detector coupled to the event player;
   wherein
      the computer software being debugged comprises a plurality of events;
      the event monitor is arranged to execute the computer software being debugged in a kernel space portion of system memory, to monitor each of the plurality of events during the execution of the computer software, and to record data regarding the each event;
      the event collector, the event player, and the concurrency error detector are each arranged to execute in a user space portion of system memory;
      the event collector is arranged to read data regarding the each event;
      the concurrency error detector is arranged to analyze the each event; and
      the event player is arranged to replay the each event in the user space portion of system memory, to create a partial-order graph of the plurality of events, to determine if an event of the plurality of events is a context entry event, and if the event is a context entry event, to create a surrogate thread and an event queue for the surrogate thread, and to schedule execution of the surrogate thread based on the partial-order graph.

2. The system of claim 1 wherein the system is arranged to debug device driver software.

3. The system of claim 1 wherein the computer software being debugged is instrumented.

4. The system of claim 1 wherein:
   the event monitor is arranged to record event type, thread identifier, central processing unit (CPU) identifier, and instruction pointer information.

5. The system of claim 4 wherein:
   the event monitor is further arranged to record context entry events, context exit events, type of context, and context identifier information related to the context entry events and context exit events.

6. The system of claim 5 wherein:
   the event monitor is further arranged to record memory address information and memory size information for memory read and memory write events; and
   the event monitor is further arranged to record memory address information, memory size information, and type of memory information for memory allocation and memory de-allocation events.

7. The system of claim 6 wherein:
   the event monitor is further arranged to record the address of a synchronization object and the type of synchronization for synchronization events.

8. The system of claim 1 wherein the event collector is arranged to read event data from the event monitor.

9. The system of claim 8 wherein the event collector is further arranged to be readable from the user space of system memory.

10. The system of claim 9 wherein the event player is arranged to read events from the event collector.

11. The system of claim 1 wherein creating a partial order graph comprises determining if events from the event collector are capable of being executed in parallel.

12. The system of claim 1 wherein the concurrency error detector is arranged to analyze each event from a surrogate thread in the event player.

13. The system of claim 1 further comprising:
a first processor arranged to execute the event monitor;
a second processor arranged to execute the event collector;
a third processor arranged to execute the event player; and
a fourth processor arranged to execute the concurrency error detector.

14. A method of debugging computer program code comprising:
executing instrumented program code in a kernel space of system memory, wherein the instrumented computer program code comprises a plurality of events;
monitoring each event of the plurality of events during the execution of the computer program code;
recording data regarding the each event;
reading data regarding the each event in a user space of system memory;
replaying the each event in the user space of system memory;
analyzing the each event in the user space of system memory; and
wherein replaying the each event in the user space of memory comprises:
creating a partial-order graph of the plurality of events;
determining if an event in the plurality of events is a context entry event;
if the event is a context entry event, creating a surrogate thread and an event queue for the surrogate thread; and
scheduling the execution of the surrogate thread based on the partial-order graph.

15. The method of claim 14 wherein monitoring each event comprises recording event type, thread identifier, CPU identifier, and instruction pointer information.

16. The method of claim 15 wherein monitoring each event further comprises:
recording context entry events, context exit events, type of context, and context identifier information related to the context entry events and context exit events;
recording memory address information and memory size information for memory read and memory write events;
recording memory address information, memory size information, and type of memory information for memory allocation and memory de-allocation events;
recording the address of a synchronization object and the type of synchronization for synchronization events.

17. The method of claim 14 wherein creating a partial order graph comprises determining which events of the plurality of events are capable of being executed in parallel.

18. The method of claim 17 further comprising:
creating a surrogate thread for each event that is capable of being executed in parallel.

19. A non-transitory, machine-readable medium including instructions for debugging a computer program code, which when executed by a computing device, cause the computing device to:
execute instrumented program code in a kernel space of system memory, wherein the instrumented computer program code comprises a plurality of events;
monitor each event of the plurality of events during the execution of the computer program code;
record data regarding each event;
read data regarding the each event in a user space of system memory;
replay the each event in the user space of system memory; and
analyze the each event in the user space of system memory; and
wherein the replay of the each event in the user space of memory includes:
creating a partial-order graph of the plurality of events;
determining if an event in the plurality of events is a context entry event;
if the event is a context entry event, creating a surrogate thread and an event queue for the surrogate thread; and
scheduling the execution of the surrogate thread based on the partial-order graph.

20. The machine-readable medium of claim 19 wherein monitoring each event comprises recording event type, thread identifier, CPU identifier, and instruction pointer information.

21. The machine-readable medium of claim 20 wherein monitoring each event further comprises:
recording context entry events, context exit events, type of context, and context identifier information related to the context entry events and context exit events;
recording memory address information and memory size information for memory read and memory write events;
recording memory address information, memory size information, and type of memory information for memory allocation and memory de-allocation events;
recording the address of a synchronization object and the type of synchronization for synchronization events.

22. The machine-readable medium of claim 19 wherein creating a partial order graph comprises determining which events of the plurality of events are capable of being executed in parallel.

* * * * *